(12) United States Patent
Molina et al.

(10) Patent No.: US 11,442,691 B2
(45) Date of Patent: Sep. 13, 2022

(54) DATABASE SYSTEMS AND METHODS FOR CONVERSATION-DRIVEN DYNAMIC UPDATES

(71) Applicant: salesforce.com, inc., San Francisco, CA (US)

(72) Inventors: Alan Cardel Molina, San Francisco, CA (US); Carlos Enrique Mogollan Jimenez, San Francisco, CA (US); Chaitanya Malla, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 17/304,204

(22) Filed: Jun. 16, 2021

(65) Prior Publication Data

US 2021/0311695 A1    Oct. 7, 2021

Related U.S. Application Data

(63) Continuation of application No. 17/302,172, filed on Apr. 26, 2021, which is a continuation of application
(Continued)

(51) Int. Cl.
*G06F 3/048* (2013.01)
*G06F 3/16* (2006.01)
(Continued)

(52) U.S. Cl.
CPC ............ *G06F 3/165* (2013.01); *G06F 3/0484* (2013.01); *G06F 16/248* (2019.01); *G06F 16/2455* (2019.01)

(58) Field of Classification Search
CPC .... G06F 3/0484; G06F 3/165; G06F 16/2455; G06F 16/248
See application file for complete search history.

(56) References Cited

U.S. PATENT DOCUMENTS 5,577,188 A    11/1996    Zhu
5,608,872 A    3/1997    Schwartz et al.
(Continued)

*Primary Examiner* — Claudia Dragoescu
(74) *Attorney, Agent, or Firm* — LKGlobal | Lorenz & Kopf, LLP

(57) ABSTRACT

Computing systems, database systems, and related conversational updating methods are provided for dynamically updating graphical user interfaces responsive to conversational user inputs received via a chatbot or other conversational interactions with a user. One method involves receiving a conversational user input from a conversation session graphical user interface display presented at a client device, identifying a desire to perform an action with respect to a database component based on the conversational user input, creating a database entry corresponding to the conversational user input, obtaining data corresponding to the conversational user input from a database communicatively coupled to the server, and providing an update to a second graphical user interface display at the client device in response to the conversational user input, wherein the update is influenced by the data corresponding to the conversational user input obtained from the database and reflects the desired action with respect to the database component.

20 Claims, 7 Drawing Sheets

Related U.S. Application Data

No. 16/368,238, filed on Mar. 28, 2019, now Pat. No. 11,016,722.

(60) Provisional application No. 62/735,763, filed on Sep. 24, 2018.

(51) Int. Cl.
*G06F 16/248* (2019.01)
*G06F 16/2455* (2019.01)
*G06F 3/0484* (2022.01)

(56) References Cited

U.S. PATENT DOCUMENTS

| | | | |
|---|---|---|---|
| 5,649,104 | A | 7/1997 | Carleton et al. |
| 5,715,450 | A | 2/1998 | Ambrose et al. |
| 5,761,419 | A | 6/1998 | Schwartz et al. |
| 5,819,038 | A | 10/1998 | Carleton et al. |
| 5,821,937 | A | 10/1998 | Tonelli et al. |
| 5,831,610 | A | 11/1998 | Tonelli et al. |
| 5,873,096 | A | 2/1999 | Lim et al. |
| 5,918,159 | A | 6/1999 | Fomukong et al. |
| 5,963,953 | A | 10/1999 | Cram et al. |
| 6,092,083 | A | 7/2000 | Brodersen et al. |
| 6,161,149 | A | 12/2000 | Achacoso et al. |
| 6,169,534 | B1 | 1/2001 | Raffel et al. |
| 6,178,425 | B1 | 1/2001 | Brodersen et al. |
| 6,189,011 | B1 | 2/2001 | Lim et al. |
| 6,216,135 | B1 | 4/2001 | Brodersen et al. |
| 6,233,617 | B1 | 5/2001 | Rothwein et al. |
| 6,266,669 | B1 | 7/2001 | Brodersen et al. |
| 6,295,530 | B1 | 9/2001 | Ritchie et al. |
| 6,324,568 | B1 | 11/2001 | Diec et al. |
| 6,324,693 | B1 | 11/2001 | Brodersen et al. |
| 6,336,137 | B1 | 1/2002 | Lee et al. |
| D454,139 | S | 3/2002 | Feldcamp et al. |
| 6,367,077 | B1 | 4/2002 | Brodersen et al. |
| 6,393,605 | B1 | 5/2002 | Loomans |
| 6,405,220 | B1 | 6/2002 | Brodersen et al. |
| 6,434,550 | B1 | 8/2002 | Warner et al. |
| 6,446,089 | B1 | 9/2002 | Brodersen et al. |
| 6,535,909 | B1 | 3/2003 | Rust |
| 6,549,908 | B1 | 4/2003 | Loomans |
| 6,553,563 | B2 | 4/2003 | Ambrose et al. |
| 6,560,461 | B1 | 5/2003 | Fomukong et al. |
| 6,574,635 | B2 | 6/2003 | Stauber et al. |
| 6,577,726 | B1 | 6/2003 | Huang et al. |
| 6,601,087 | B1 | 7/2003 | Zhu et al. |
| 6,604,117 | B2 | 8/2003 | Lim et al. |
| 6,604,128 | B2 | 8/2003 | Diec |
| 6,609,150 | B2 | 8/2003 | Lee et al. |
| 6,621,834 | B1 | 9/2003 | Scherpbier et al. |
| 6,654,032 | B1 | 11/2003 | Zhu et al. |
| 6,665,648 | B2 | 12/2003 | Brodersen et al. |
| 6,665,655 | B1 | 12/2003 | Warner et al. |
| 6,684,438 | B2 | 2/2004 | Brodersen et al. |
| 6,711,565 | B1 | 3/2004 | Subramaniam et al. |
| 6,724,399 | B1 | 4/2004 | Katchour et al. |
| 6,728,702 | B1 | 4/2004 | Subramaniam et al. |
| 6,728,960 | B1 | 4/2004 | Loomans et al. |
| 6,732,095 | B1 | 5/2004 | Warshavsky et al. |
| 6,732,100 | B1 | 5/2004 | Brodersen et al. |
| 6,732,111 | B2 | 5/2004 | Brodersen et al. |
| 6,754,681 | B2 | 6/2004 | Brodersen et al. |
| 6,763,351 | B1 | 7/2004 | Subramaniam et al. |
| 6,763,501 | B1 | 7/2004 | Zhu et al. |
| 6,768,904 | B2 | 7/2004 | Kim |
| 6,772,229 | B1 | 8/2004 | Achacoso et al. |
| 6,782,383 | B2 | 8/2004 | Subramaniam et al. |
| 6,804,330 | B1 | 10/2004 | Jones et al. |
| 6,826,565 | B2 | 11/2004 | Ritchie et al. |
| 6,826,582 | B1 | 11/2004 | Chatterjee et al. |
| 6,826,745 | B2 | 11/2004 | Coker |
| 6,829,655 | B1 | 12/2004 | Huang et al. |
| 6,842,748 | B1 | 1/2005 | Warner et al. |
| 6,850,895 | B2 | 2/2005 | Brodersen et al. |
| 6,850,949 | B2 | 2/2005 | Warner et al. |
| 7,062,502 | B1 | 6/2006 | Kesler |
| 7,069,231 | B1 | 6/2006 | Cinarkaya et al. |
| 7,181,758 | B1 | 2/2007 | Chan |
| 7,289,976 | B2 | 10/2007 | Kihneman et al. |
| 7,340,411 | B2 | 3/2008 | Cook |
| 7,356,482 | B2 | 4/2008 | Frankland et al. |
| 7,401,094 | B1 | 7/2008 | Kesler |
| 7,412,455 | B2 | 8/2008 | Dillon |
| 7,508,789 | B2 | 3/2009 | Chan |
| 7,620,655 | B2 | 11/2009 | Larsson et al. |
| 7,698,160 | B2 | 4/2010 | Beaven et al. |
| 7,730,478 | B2 | 6/2010 | Weissman |
| 7,779,475 | B2 | 8/2010 | Jakobson et al. |
| 8,014,943 | B2 | 9/2011 | Jakobsen |
| 8,015,495 | B2 | 9/2011 | Achacoso et al. |
| 8,032,297 | B2 | 10/2011 | Jakobsen |
| 8,082,301 | B2 | 12/2011 | Ahlgren et al. |
| 8,095,413 | B1 | 1/2012 | Beaven |
| 8,095,594 | B2 | 1/2012 | Beaven et al. |
| 8,209,308 | B2 | 6/2012 | Rueben et al. |
| 8,275,836 | B2 | 9/2012 | Beaven et al. |
| 8,457,545 | B2 | 6/2013 | Chan |
| 8,484,111 | B2 | 7/2013 | Frankland et al. |
| 8,490,025 | B2 | 7/2013 | Jakobson et al. |
| 8,504,945 | B2 | 8/2013 | Jakobson et al. |
| 8,510,045 | B2 | 8/2013 | Rueben et al. |
| 8,510,664 | B2 | 8/2013 | Rueben et al. |
| 8,566,301 | B2 | 10/2013 | Rueben et al. |
| 8,646,103 | B2 | 2/2014 | Jakobson et al. |
| 10,542,077 | B1 | 1/2020 | Balakrishnan et al. |
| 10,594,840 | B1 * | 3/2020 | Darby .................... H04W 4/14 |
| 2001/0044791 | A1 | 11/2001 | Richter et al. |
| 2002/0072951 | A1 | 6/2002 | Lee et al. |
| 2002/0082892 | A1 | 6/2002 | Raffel |
| 2002/0129352 | A1 | 9/2002 | Brodersen et al. |
| 2002/0140731 | A1 | 10/2002 | Subramanian et al. |
| 2002/0143997 | A1 | 10/2002 | Huang et al. |
| 2002/0162090 | A1 | 10/2002 | Parnell et al. |
| 2002/0165742 | A1 | 11/2002 | Robbins |
| 2003/0004971 | A1 | 1/2003 | Gong |
| 2003/0018705 | A1 | 1/2003 | Chen et al. |
| 2003/0018830 | A1 | 1/2003 | Chen et al. |
| 2003/0066031 | A1 | 4/2003 | Laane et al. |
| 2003/0066032 | A1 | 4/2003 | Ramachandran et al. |
| 2003/0069936 | A1 | 4/2003 | Warner et al. |
| 2003/0070000 | A1 | 4/2003 | Coker et al. |
| 2003/0070004 | A1 | 4/2003 | Mukundan et al. |
| 2003/0070005 | A1 | 4/2003 | Mukundan et al. |
| 2003/0074418 | A1 | 4/2003 | Coker et al. |
| 2003/0120675 | A1 | 6/2003 | Stauber et al. |
| 2003/0151633 | A1 | 8/2003 | George et al. |
| 2003/0159136 | A1 | 8/2003 | Huang et al. |
| 2003/0187921 | A1 | 10/2003 | Diec et al. |
| 2003/0189600 | A1 | 10/2003 | Gune et al. |
| 2003/0204427 | A1 | 10/2003 | Gune et al. |
| 2003/0206192 | A1 | 11/2003 | Chen et al. |
| 2003/0225730 | A1 | 12/2003 | Warner et al. |
| 2004/0001092 | A1 | 1/2004 | Rothwein et al. |
| 2004/0010489 | A1 | 1/2004 | Rio et al. |
| 2004/0015981 | A1 | 1/2004 | Coker et al. |
| 2004/0027388 | A1 | 2/2004 | Berg et al. |
| 2004/0128001 | A1 | 7/2004 | Levin et al. |
| 2004/0186860 | A1 | 9/2004 | Lee et al. |
| 2004/0193510 | A1 | 9/2004 | Catahan et al. |
| 2004/0199489 | A1 | 10/2004 | Barnes-Leon et al. |
| 2004/0199536 | A1 | 10/2004 | Barnes-Leon et al. |
| 2004/0199543 | A1 | 10/2004 | Braud et al. |
| 2004/0249854 | A1 | 12/2004 | Barnes-Leon et al. |
| 2004/0260534 | A1 | 12/2004 | Pak et al. |
| 2004/0260659 | A1 | 12/2004 | Chan et al. |
| 2004/0268299 | A1 | 12/2004 | Lei et al. |
| 2005/0050555 | A1 | 3/2005 | Exley et al. |
| 2005/0091098 | A1 | 4/2005 | Brodersen et al. |
| 2006/0021019 | A1 | 1/2006 | Hinton et al. |
| 2008/0120380 | A1 | 5/2008 | Boyd et al. |
| 2008/0249972 | A1 | 10/2008 | Dillon |
| 2009/0063414 | A1 | 3/2009 | White et al. |

(56) References Cited

U.S. PATENT DOCUMENTS

| | | |
|---|---|---|
| 2009/0077212 A1* | 3/2009 | Appleton .............. H04L 41/069 |
| | | 709/223 |
| 2009/0100342 A1 | 4/2009 | Jakobsen |
| 2009/0177744 A1 | 7/2009 | Marlow et al. |
| 2011/0247051 A1 | 10/2011 | Bulumulla et al. |
| 2012/0042218 A1 | 2/2012 | Cinarkaya et al. |
| 2012/0079427 A1 | 3/2012 | Carmichael et al. |
| 2012/0218958 A1 | 8/2012 | Rangaiah et al. |
| 2012/0233137 A1 | 9/2012 | Jakobsen et al. |
| 2013/0212497 A1 | 8/2013 | Zelenko et al. |
| 2013/0218948 A1 | 8/2013 | Jakobsen |
| 2013/0218949 A1 | 8/2013 | Jakobsen |
| 2013/0218966 A1 | 8/2013 | Jakobsen |
| 2013/0247216 A1 | 9/2013 | Cinarkaya et al. |
| 2015/0019989 A1 | 1/2015 | Rogers et al. |
| 2016/0226829 A1 | 8/2016 | Steeves et al. |
| 2016/0232339 A1* | 8/2016 | Yang .................... G06F 3/1423 |
| 2017/0078448 A1 | 3/2017 | Overman |
| 2017/0329466 A1* | 11/2017 | Krenkler ................ G06F 40/30 |
| 2018/0295071 A1* | 10/2018 | Jain ........................ G06F 40/35 |

\* cited by examiner

DATABASE SYSTEMS AND METHODS FOR CONVERSATION-DRIVEN DYNAMIC UPDATES

CROSS-REFERENCE TO RELATED APPLICATION(S)

This application is a continuation of U.S. patent application Ser. No. 17/302,172, filed Apr. 26, 2021, which is a continuation of U.S. patent application Ser. No. 16/368,238, filed Mar. 28, 2019, now U.S. Pat. No. 11,016,722, issued May 25, 2021, which claims the benefit of U.S. Provisional Patent Application Ser. No. 62/735,763, filed Sep. 24, 2018, the entire content of which is incorporated by reference herein.

TECHNICAL FIELD

Embodiments of the subject matter described herein relate generally to database systems, and more particularly, to methods and systems that support dynamic graphical user interface updates responsive to conversational interactions with a database system.

BACKGROUND

Modern software development is evolving away from the client-server model toward network-based processing systems that provide access to data and services via the Internet or other networks. In contrast to traditional systems that host networked applications on dedicated server hardware, a "cloud" computing model allows applications to be provided over the network "as a service" or "on-demand" by an infrastructure provider. The infrastructure provider typically abstracts the underlying hardware and other resources used to deliver a customer-developed application so that the customer no longer needs to operate and support dedicated server hardware. The cloud computing model can often provide substantial cost savings to the customer over the life of the application because the customer no longer needs to provide dedicated network infrastructure, electrical and temperature controls, physical security and other logistics in support of dedicated server hardware.

Developments in artificial intelligence and computational linguistics have enabled conversational interactions with users as an alternative to conventional human machine interfaces or graphical user interfaces that many users may find more accessible or otherwise preferable to navigating a complex sequence of menus or other graphical user interface displays using conventional interfaces, which can be difficult and time-consuming for users who are relatively inexperienced or otherwise unfamiliar with the software platform(s). Thus, many applications increasingly incorporate so-called "chatbots," virtual assistants, or other software agents to support interfacing with users in a manner that attempts to reduce the burden on the user by using natural language processing. However, such conversational software agents are often implemented in isolation, which often requires additional user interaction outside of the conversation to achieve a user's objective. Accordingly, it is desirable to provide methods and systems that supplementally respond to conversational interaction in automated manner to reduce the time and effort required by individual users.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIGS. 3-5 depict an exemplary graphical user interface (GUI) display sequence illustrating the conversational updating processes described herein in accordance with one or more exemplary embodiments;

DETAILED DESCRIPTION

Figure 1:
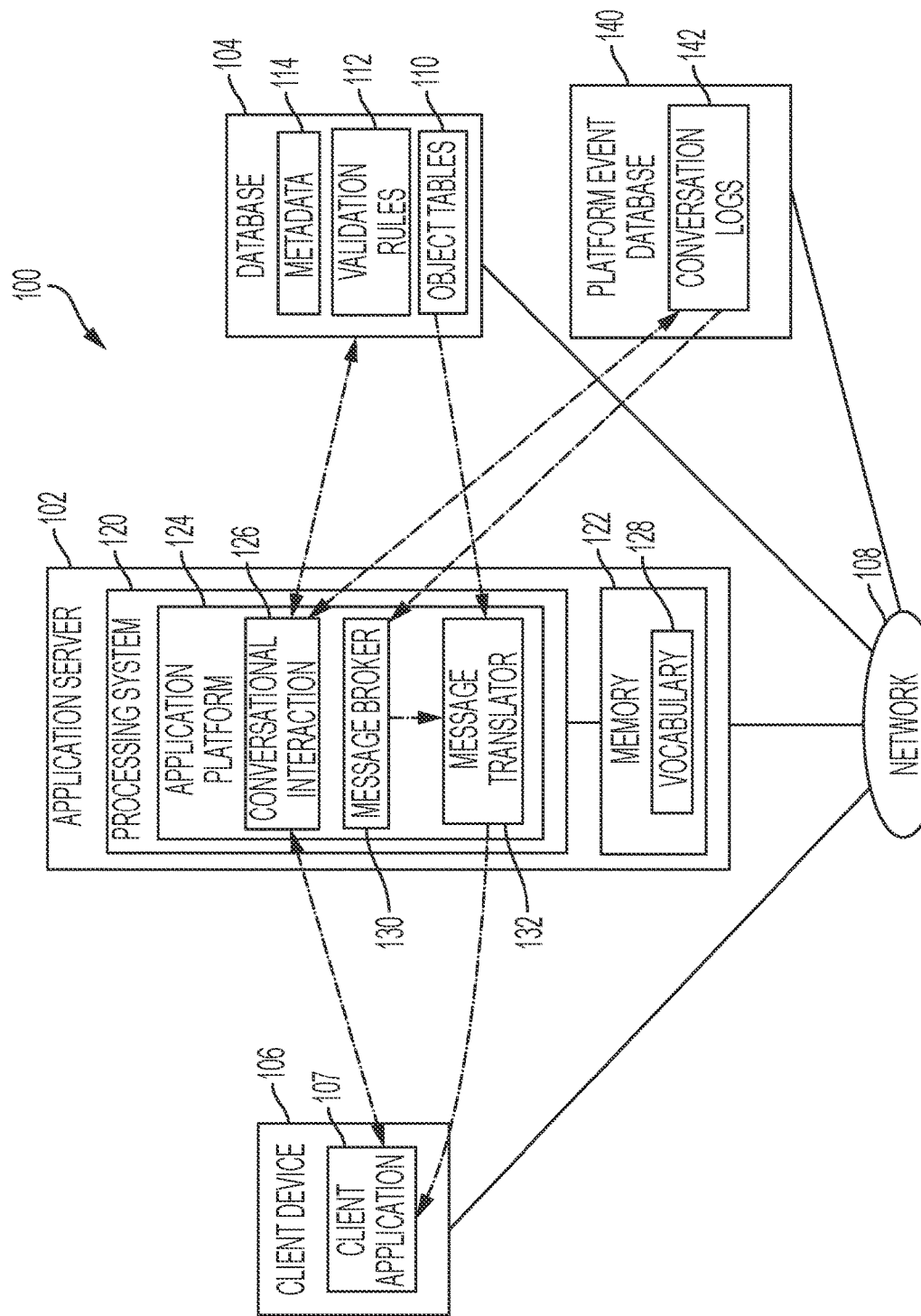
FIG. 1 is a block diagram of an exemplary computing system.

Embodiments of the subject matter described herein generally relate to methods and systems for dynamically updating graphical user interface (GUI) displays responsive to conversational user interactions with a database system. Depending on the embodiment, the conversational user input may be realized as an unconstrained string or combination of words provided in a free-form or unstructured manner using natural language rather than a predefined syntax, or the conversational user input may be otherwise received in the context of a conversational interaction with a database system. The content or payload of a conversational user input may be parsed or otherwise analyzed to identify the relevant component of the database system to which the user input is directed, an action that is desired to be performed with respect to that component and/or other aspects associated with the database component or action (e.g., attributes, fields, prerequisites, etc.).

As described in greater detail below, in exemplary embodiments, for each conversational interaction with a user of a client device, a corresponding log of the conversation is created in a database that maintains an association between the conversation session and the constituent messages of the conversation. In response to receiving a conversational user input, a corresponding message entry is created in the conversation log (or message bus) that includes or otherwise maintains the payload of the conversational user input in association with the conversation session. In some embodiments, one or more workflow rules are applied to determine whether or not to tag, mark, encode, or otherwise designate the newly created message entry as corresponding to a platform event.

A message brokering application or software agent, alternatively referred to herein as a message broker, continually monitors the conversation log associated with an active conversation to identify new message. In response to identifying a new message, the message broker queries the database to obtain the payload of the message and then parses or otherwise analyzes the payload of the message to identify the relevant database component(s), action(s), attribute(s), field(s), and the like that were included in the conversational user input. Thereafter, the message broker generates one or more query statements and then queries a database in accordance with the message payload (e.g., by querying for instances of an identified type of database object having associated attributes or fields matching those attributes or fields provided in the conversational user input). The message broker may also invoke or otherwise perform one or more actions indicated by the conversational user input on the data obtained as a result of the querying. Thereafter, the resulting data is utilized to generate or otherwise provide one or more updated GUI displays (or update an existing GUI element previously presented thereon) on the client device in a manner that is responsive to or otherwise reflects the most recently received conversational user input in real-time. In some embodiments, the message broker only monitors for messages tagged as corresponding to platform events and only generates GUI updates in response to such platform event messages without taking action with respect to message entries that are not designated as platform events.

For example, in one or more exemplary embodiments, a chatbot component associated with a conversational GUI display presented at a client device utilizes natural language processing to analyze conversational user input and identify or otherwise determine an intent or objective of a user of the client device to perform an action with respect to a component of a database system (e.g., viewing instances of a database object, viewing or running a report summarizing instances of a database object, viewing or modifying fields of a database object, etc.). In response to identifying a desire to perform an action with respect to a database component, the chatbot component triggers a corresponding publish message flow in a database layer that pertains to that action. In this regard, when a user initiates or otherwise activates the chatbot component (e.g., by clicking on the chatbot button in a web page), that initiating event is utilized to generate a key or value (e.g., a combination of the user's email address and a cryptographic hash value) for managing the chatbot session in the database system. In the absence of the requisite user information for managing the chatbot session, the chatbot component may generate or trigger a GUI display or obtaining user information (e.g., email address, name, etc.) before enabling conversational interaction. The chatbot session key is then utilized to associate the chatbot GUI display with the underlying web page or GUI display from which the chatbot was initiated. In this regard, the GUI display may be automatically subscribed to the chatbot session upon creation of the chatbot session key. Thereafter, when the chatbot component determines the user intent to perform an action with respect to a database component, a corresponding publish message event is created in the database that maintains the association between the chatbot session key, the identified action and the related database component. In this regard, the publish message event may be added to a message bus that allows events to be added in a chronological order.

In exemplary embodiment, the chatbot component creates the publish message event using a custom bot message event or otherwise designates the publish message event as a bot message. A separate message broker component monitors the message bus or other component or layer of the database for bot message events and identifies or otherwise determines whether a bot message event is relevant to the current user of the client device using the chatbot session key. When a bot message event pertaining to a chatbot session that a GUI display is subscribed to is identified, the bot message event is translated or otherwise transformed into a GUI event that is published, provided or otherwise made available to the GUI display. In response, GUI components in the GUI display that are impacted by the GUI event perform the action dictated by the GUI event (e.g., refresh, hide, etc.), such that the background GUI display is dynamically updated in response to events identified from within the chatbot session. Thus, a GUI display that is underlying or adjacent to a chatbot GUI may dynamically update in response to conversational input received via the chatbot GUI in a manner that reflects the user objective or intent derived from the conversational input.

FIG. 1 depicts an exemplary embodiment of a computing system 100 capable of supporting conversational interactions with a user of a client device 106 and performing corresponding actions with respect to one or more database components maintained in a database 104 and utilized by a server 102 to support an instance of an application provided by the server 102. In the illustrated embodiment, the server 102 is communicatively coupled to the database 104 and the client device 106 via a communications network 108. The communications network 108 may be realized as any sort or combination of wired and/or wireless computer network, a cellular network, a mobile broadband network, a radio network, the Internet, or the like. It should be noted that FIG. 1 is a simplified representation of a computing system 100 for purposes of explanation and is not intended to be limiting. For example, in practice, multiple instances of client devices 106 communicating on the network 108 may be present, with any number of instances of applications being provided by the server 102 to various instances of client devices 106.

The server 102 generally represents a computing device, computing system or another combination of processing logic, circuitry, hardware, and/or other components configured to support the conversational interaction processes, tasks, operations, and/or functions described herein. In this regard, the server 102 includes a processing system 120, which may be implemented using any suitable processing system and/or device, such as, for example, one or more processors, central processing units (CPUs), controllers, microprocessors, microcontrollers, processing cores and/or other hardware computing resources configured to support the operation of the processing system 120 described herein. The processing system 120 may include or otherwise access a data storage element 122 (or memory) capable of storing programming instructions for execution by the processing system 120, that, when read and executed, cause processing system 120 to support the processes described herein. Depending on the embodiment, the memory 122 may be realized as a random-access memory (RAM), read only memory (ROM), flash memory, magnetic or optical mass storage, or any other suitable non-transitory short or long-term data storage or other computer-readable media, and/or any suitable combination thereof. In one or more embodiments, the programming instructions cause the processing system 120 to create, generate, or otherwise facilitate the application platform 124 that generates or otherwise provides instances of a virtual application at run-time (or "on-demand") based at least in part upon code and other data that is stored or otherwise maintained by the database 104. Accordingly, for purposes of explanation but without limitation, the server 102 may alternatively be referred to herein as an application server 102.

In exemplary embodiments, the programming instructions also cause the processing system 120 to create, generate, or otherwise facilitate a conversational interaction engine 126 that supports the conversational interaction processes and related tasks, operations, and/or functions described herein. Depending on the embodiment, the conversational interaction engine 126 can be integrated with or otherwise incorporated as part of a virtual application, or be realized as a separate or standalone process, application programming interface (API), software agent, or the like that is capable of interacting with the client device 106 independent of the virtual application to perform actions in the database 104. As described in greater detail below, the conversational interaction engine 126 incorporates or otherwise references a vocabulary 128 of words, phrases, phonemes, or the like associated with a particular language that supports conversational interaction with the user of the client device 106. For example, the vocabulary 128 may be utilized by the conversational interaction engine 126 to provide speech recognition or otherwise parse and resolve text or other conversational input received by the conversational interaction engine 126, as well as generate or otherwise provide conversational output (e.g., text, audio, or the like) to the client device 106 for presentation to the user (e.g., in response to received conversational input). In the illustrated embodiment, the vocabulary data 128 is stored or otherwise maintained in memory 122, however, in alternative embodiments, the vocabulary data 128 may be stored or maintained in the database 104. For purposes of explanation but without limitation, the conversational interaction engine 126 may alternatively be referred to herein as a chatbot.

The client device 106 generally represents an electronic device coupled to the network 108 that may be utilized by a user to access the application platform 124 on the application server 102 to retrieve data from the database 104 via the network 108. In practice, the client device 106 can be realized as any sort of personal computer, mobile telephone, tablet or other network-enabled electronic device. In exemplary embodiments, the client device 106 includes a display device, such as a monitor, screen, or another conventional electronic display, capable of graphically presenting data and/or information provided by the application platform 124 along with a user input device, such as a touchscreen, a touch panel, a mouse, a joystick, a directional pad, a motion sensor, or the like, capable of receiving input from the user of the client device 106. The illustrated client device 106 executes or otherwise supports a client application 107 that communicates with the application platform 124 on the server 102 using a networking protocol. In some embodiments, the client application 107 is realized as a web browser or similar local client application executed by the client device 106 that contacts the application server 102 and/or application platform 124 using a networking protocol, such as the hypertext transport protocol (HTTP) or the like, to access or otherwise initiate an instance of a virtual application presented on the client device 106.

In exemplary embodiments, the database 104 stores or otherwise maintains data for integration with or invocation by a virtual application in objects organized in object tables 110. In this regard, the database 104 includes a plurality of different object tables 110 configured to store or otherwise maintain alphanumeric values, metadata, or other descriptive information that define a particular instance of a respective type of object associated with a respective object table 110. For example, the virtual application may support a number of different types of objects that may be incorporated into or otherwise depicted or manipulated by the virtual application, with each different type of object having a corresponding object table 110 that includes columns or fields corresponding to the different parameters or criteria that define a particular instance of that object.

In exemplary embodiments described herein, the database 104 stores or otherwise maintains application objects (e.g., an application object type) where the application object table 110 includes columns or fields corresponding to the different parameters or criteria that define a particular application capable of being generated or otherwise provided by the application platform 124 on a client device 106. In this regard, the database 104 may also store or maintain graphical user interface (GUI) objects that may be associated with or referenced by a particular application object and include columns or fields that define the layout, sequencing, and other characteristics of GUI displays to be presented by the application platform 124 on a client device 106 in conjunction with that application. Additionally, the database 104 stores or otherwise maintains additional database objects for association and/or integration with the application, which may include custom objects and/or standard objects, as described in greater detail below.

In exemplary embodiments, the database 104 also includes or otherwise maintains one or more validation tables 112 that include one or more validation rules or criteria associated with respective types of database object types that may be applied to entries in the various database object tables 110. A validation rule provides validation criteria for one or more fields (or columns) of a particular database object type, such as, minimum and/or maximum values for a particular field, a range of allowable values for the particular field, a set of allowable values for a particular field, or the like. Additionally, the validation rule may provide a default value to be assigned to a field (or column) of a particular database object table 110 when the value for that field of a particular record or entry in that database object table 110 does not satisfy the validation criteria for that field. In some embodiments, the validation rules associated with a particular database object type may identify or otherwise indicate required fields for that particular object.

Additionally, the database 104 stores or otherwise maintains metadata 114, which may be utilized to perform data manipulation and/or formatting. For example, the metadata 114 may include or define describe any number of workflows, process flows, formulas, business logic, structure and other database components or constructs that may be associated with a particular application database object. In this regard, in some embodiments, the metadata 114 may associated with a particular type of application or other database component may identify or otherwise indicate other database objects may be required for supporting the particular workflows, process flows, formulas, business logic, or other aspects of the logical structure of that application.

In various embodiments, the application platform 124 and/or the conversational interaction engine 126 receives or otherwise obtains a conversational input from a user of the client device 106 (e.g., via client application 107 and network 108) and parses the conversational input using the conversational vocabulary 128 to identify or otherwise discern a particular type of action that the user would like to perform with respect to a particular type of database object in the database. Based on the requested action and database object, the conversational interaction engine 126 accesses the database 104 to identify or otherwise determine what additional information or data may be required for performing the requested database action. For example, if the recognized database action is viewing instances of a particular type of object, the conversational interaction engine 126 accesses the metadata 114 and/or validation rules 112 associated with that particular type of object to identify any fields, attributes, or the like that may be utilized to further filter or refine the view for that particular type of object.

As described in greater detail below in the context of FIGS. 2-6, in exemplary embodiments, the programming instructions stored or maintained in memory 122 also cause the processing system 120 to create, generate, or otherwise facilitate a message brokering application 130 that supports the conversational updating processes and related tasks, operations, and/or functions described herein to dynamically update one or more GUI displays (or components thereof) at the client device 106 responsive to conversational user input received from the client device 106. For purposes of explanation and without limitation, the message brokering application 130 is alternatively referred to herein as a message broker. Depending on the embodiment, the conversational interaction engine 126 can be integrated with or otherwise incorporated as part of a virtual application, or be realized as a separate or standalone process, application programming interface (API), software agent, or the like that monitors conversation log data 142 maintained in a platform event database 140 coupled to the network 108 to identify, substantially in real-time, new messages associated with a current conversational interaction between the client application 107 and the chatbot 126. In response to a new message associated with the current conversation session between the client application 107 and the chatbot 126, the message broker 130 retrieves or otherwise obtains, via the network 108, the payload or other content associated with that message that is stored in the conversation logs 142 at the platform event database 140 from the platform event database 140.

In exemplary embodiments, the programming instructions stored or maintained in memory 122 also cause the processing system 120 to create, generate, or otherwise facilitate a message translating application 132 (or message translator) that is configured to translate or otherwise transform the message payload and/or other platform event information received from the message broker 130 into corresponding updates to the GUI displays and/or components presented within the client application 107 at the client device 106. In this regard, the message translator 132 may utilize the message payload to generate query statements for querying or otherwise obtaining data from the object tables 110 in the database 104 and perform other filtering or processing of such object data corresponding to the message payload in accordance with the message payload. Thereafter, the message translator 132 may dynamically update one or more GUI components within a GUI display associated with the client application 107 to reflect the data obtained from the database 104 responsive to the conversational user input. Thus, background GUI components or background GUI displays may be dynamically updated substantially in real-time to reflect conversational user input received via an overlying GUI display associated with the conversation session with the chatbot 126. It should be noted that although FIG. 1 depicts the message broker 130 and the message translator 132 as separate components, in practice, the features or functionality of the message translator 132 may be integrated with the message broker 130. Additionally, although FIG. 1 depicts each of the chatbot 126, the message broker 130, and the message translator 132 as being implemented at an individual server 102, in practice, one or more may be distributed across different servers, for example, at or within a server farm, which may reside behind a load balancer.

Figure 2:
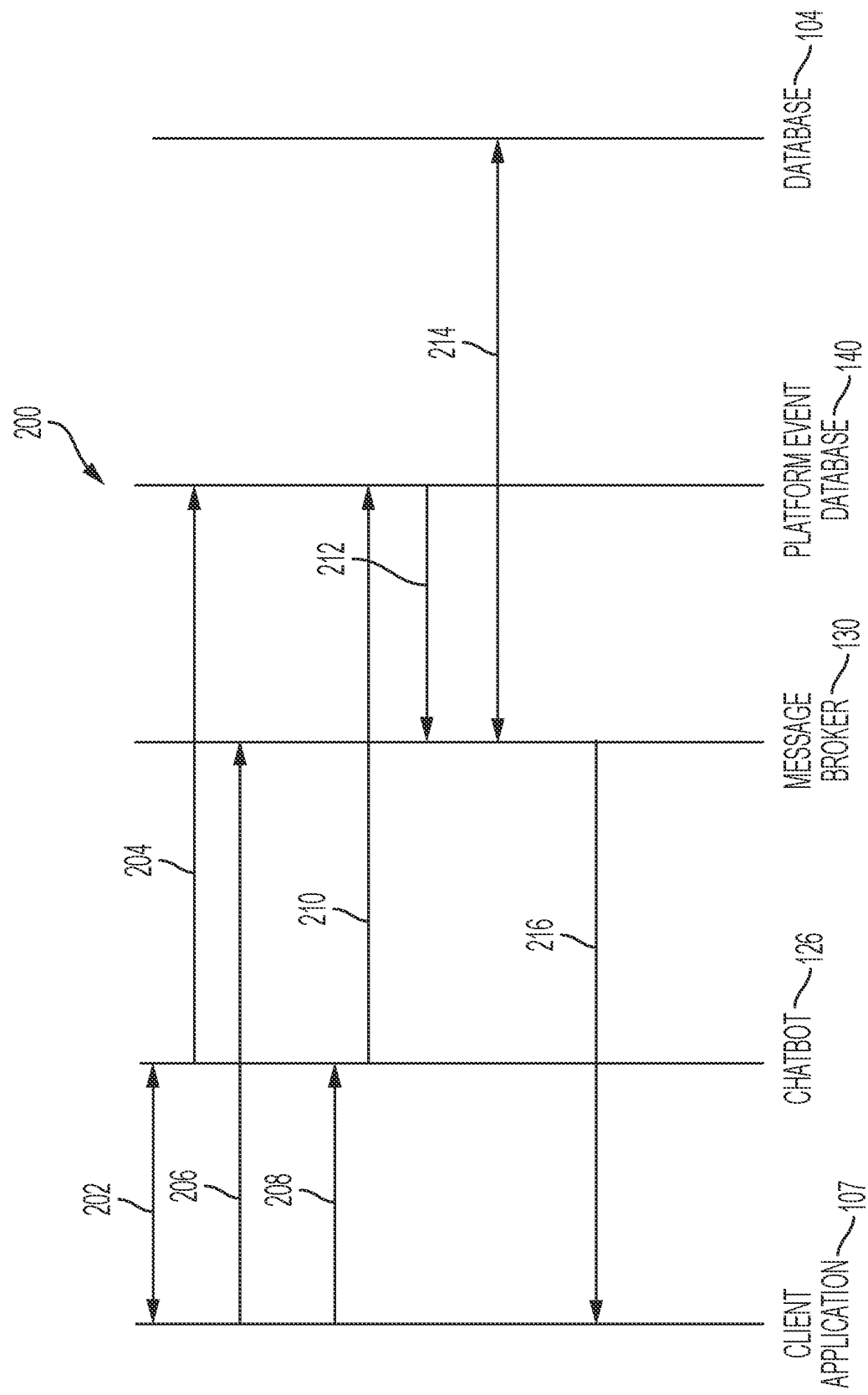
FIG. 2 depicts a sequence of communications within the computing system of FIG. 1 in accordance with one exemplary embodiment of the conversational updating processes described herein.

FIG. 2 depicts an exemplary sequence 200 of communications within the computing system 100 in accordance with one or more embodiments of the conversation-driven updating processes described herein. Referring to FIG. 2 with continued reference to FIG. 1, the sequence 200 begins with the client application 107 and the chatbot 126 communicating 202 to establish a conversation session. For example, the application server 102 and/or application platform 124 may receive login credentials or other authentication information from the client device 106 via the network 108, authenticate the user, and then utilize a user ID or other identifier(s) associated with the user to initiate a virtual application within the client application 107 at the client device 106. In one or more embodiments, a conversation session may be initiated in response to a user selecting a GUI element for a help feature, a digital assistant, or similar feature supported by the application platform 124, and in response, the application platform 124 may generate or otherwise provide a GUI display (e.g., a chat window) or other GUI elements within the client application 107 on the client device 106 that prompt the user to indicate what he or she would like to accomplish. In other embodiments, the chatbot 126 automatically creates or otherwise initiates a conversation session by generating a unique session key or similar identifier to be associated with the conversation and generating or otherwise providing a chat GUI display within the client application 107.

In exemplary embodiments, the chatbot 126 transmits 204 or otherwise provides the session key for the current conversation to the platform event database 140. In this regard, the chatbot 126 communicates with the platform event database 140 to initiate the conversation session in the conversation log data 142 or otherwise configure the platform event database 140 for tracking the current conversation. In the illustrated embodiment, in response to receiving the session key from the chatbot 126, the client application 107 automatically transmits 206 or otherwise provides the session key to the message broker 130 for monitoring the current conversation session. In other embodiments, the message broker 130 may receive the session key from the chatbot 126, or the message broker 130 may continually monitor the platform event database 140 to identify the instantiation of a new conversation and obtain the session key associated therewith.

The user of the client device 106 interacts or otherwise communicates 208 with the chatbot 126 via an associated GUI display within the client application 107 (e.g., a chat window) to transmit or otherwise provide user input in the context of the current conversation. The conversational user input is indicative of the particular database object or action the user would like to perform. Depending on the embodiment, the conversational input may be received by the user selecting or otherwise activating a GUI element presented within the chat window, or the user may input (e.g., via typing, swiping, touch, voice, or any other suitable method) a conversational string of words in a free-form or unconstrained manner, which is captured by a user input device of the client device 106 and provided over the network 108 to the application platform 124 and/or the chatbot 126 via the client application 107. The chatbot 126 parses or otherwise analyzes the conversational input using natural language processing to identify the desired database action the user would like to perform and/or the type of database component implicated by that database action based on the content, syntax, structure and/or other linguistic characteristics of the conversational input. In one or more embodiments, the chatbot 126 applies one or more workflow rules or other logging rules or criteria to determine whether the conversational user input corresponds to a platform event.

When the received conversational user input corresponds to a platform event, the chatbot 126 transmits or otherwise provides 210 the payload or content of the conversational input to the platform event database 140, which stores or otherwise maintains a new entry for the newly received message associated with the conversation session in the conversation log 142. The entry for the new message in the conversation log 142 includes the unique session key or other identifiers associated with the current conversation session in association with the payload or content of the received conversational user input. Additionally, in some embodiments, the chatbot 126 may tag, mark, or otherwise designate the new message entry as corresponding to a platform event update (e.g., a bot message event).

The message broker 130 periodically or continually monitors the conversation logs 142 in the platform event database 140 for new message entries corresponding to a conversation session that the message broker 130 is subscribed to. In some embodiments, the message broker 130 monitors for new message entries that match a subscribed session key that are also marked or designated as a platform event update (e.g., a bot message event). In response to identifying a new message entry having an associated session key that matches the session key received via communication 206, the message broker 130 retrieves or otherwise obtains 212 the payload and/or content associated with that new message, and then utilizes the received message content to query or otherwise retrieve 214 corresponding data from the object tables 110 in the database 104. Although not shown in FIG. 2, in some embodiments, the message broker 130 utilizes the message translator 132 to translate the payload or content of the platform event update into one or more query statements configured to retrieve the relevant data or information for creating a corresponding event for updating GUI displays or components within the client application 107 (e.g., to translate a bot message event into a GUI event). After retrieving the object data corresponding to the received conversational input, the message broker 130 (or message translator 132) transmits or otherwise provides 216 updates to one or more GUI display(s) or GUI component(s) presented within the client application 107 at the client device 106. Thus, background GUI displays or background GUI components may be dynamically updated 216 in response to a received conversational user input 208 within an overlying GUI display associated with a conversation session with the chatbot 126.

Figure 3:
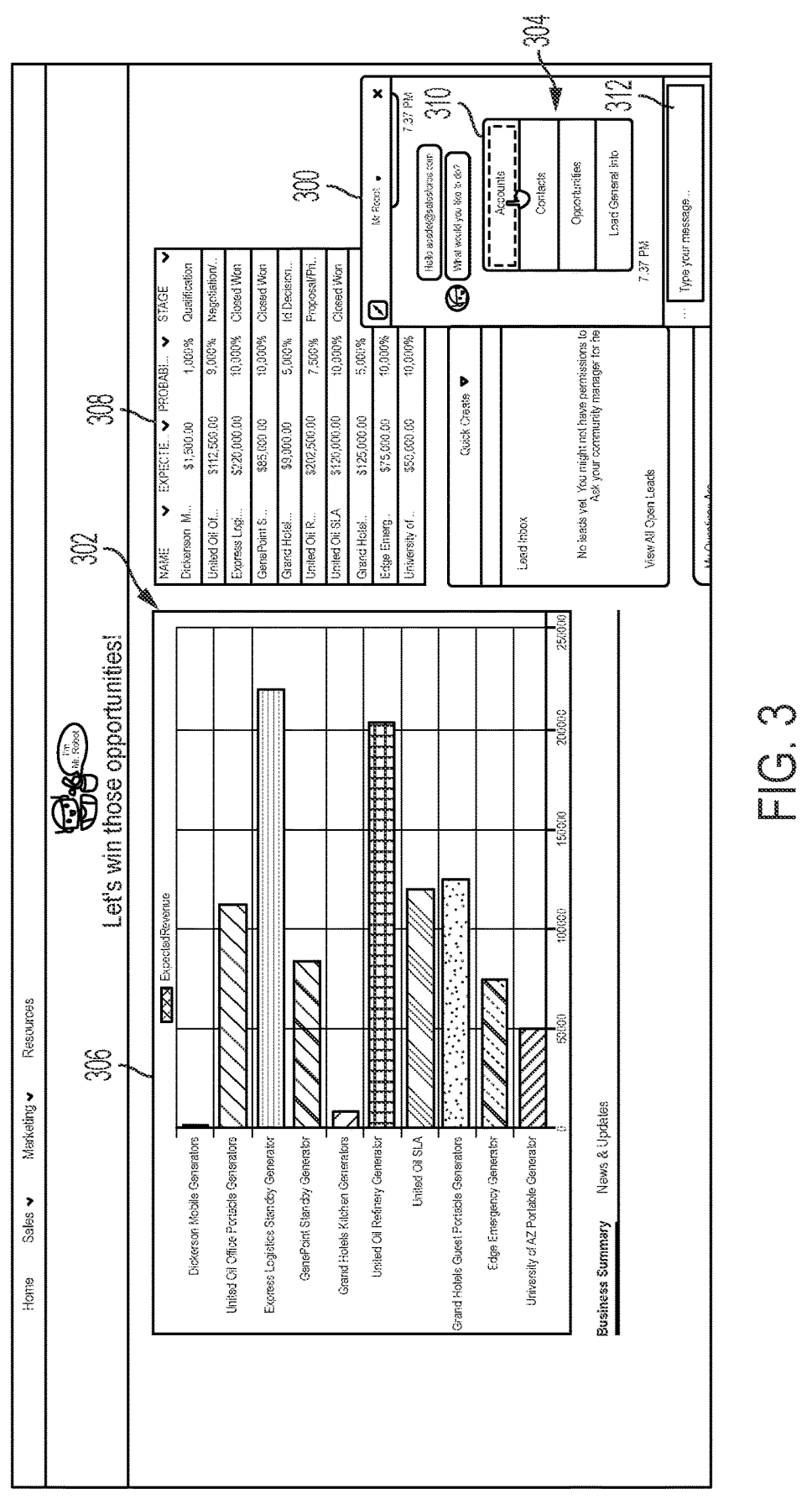
Figure 4:
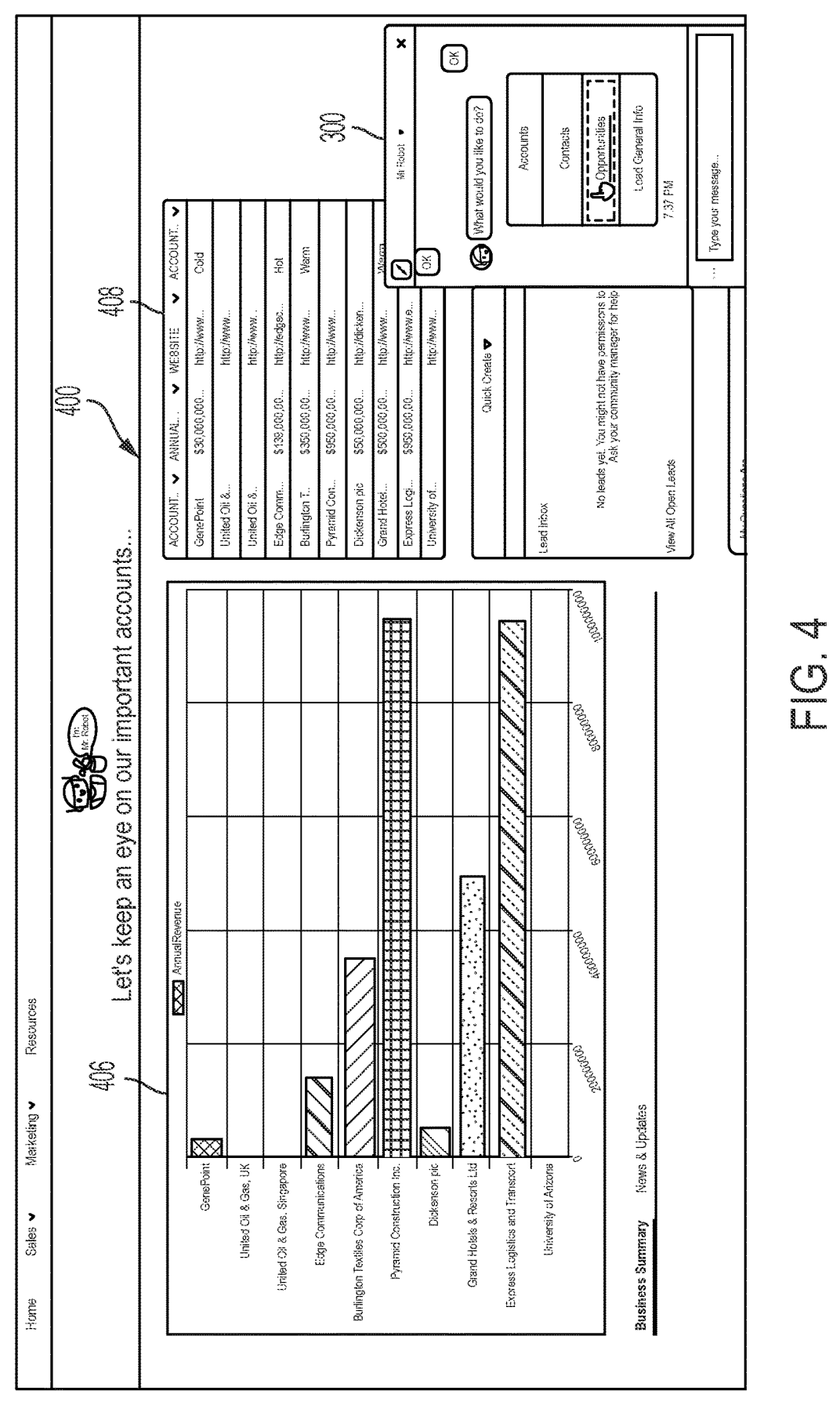
Figure 5:
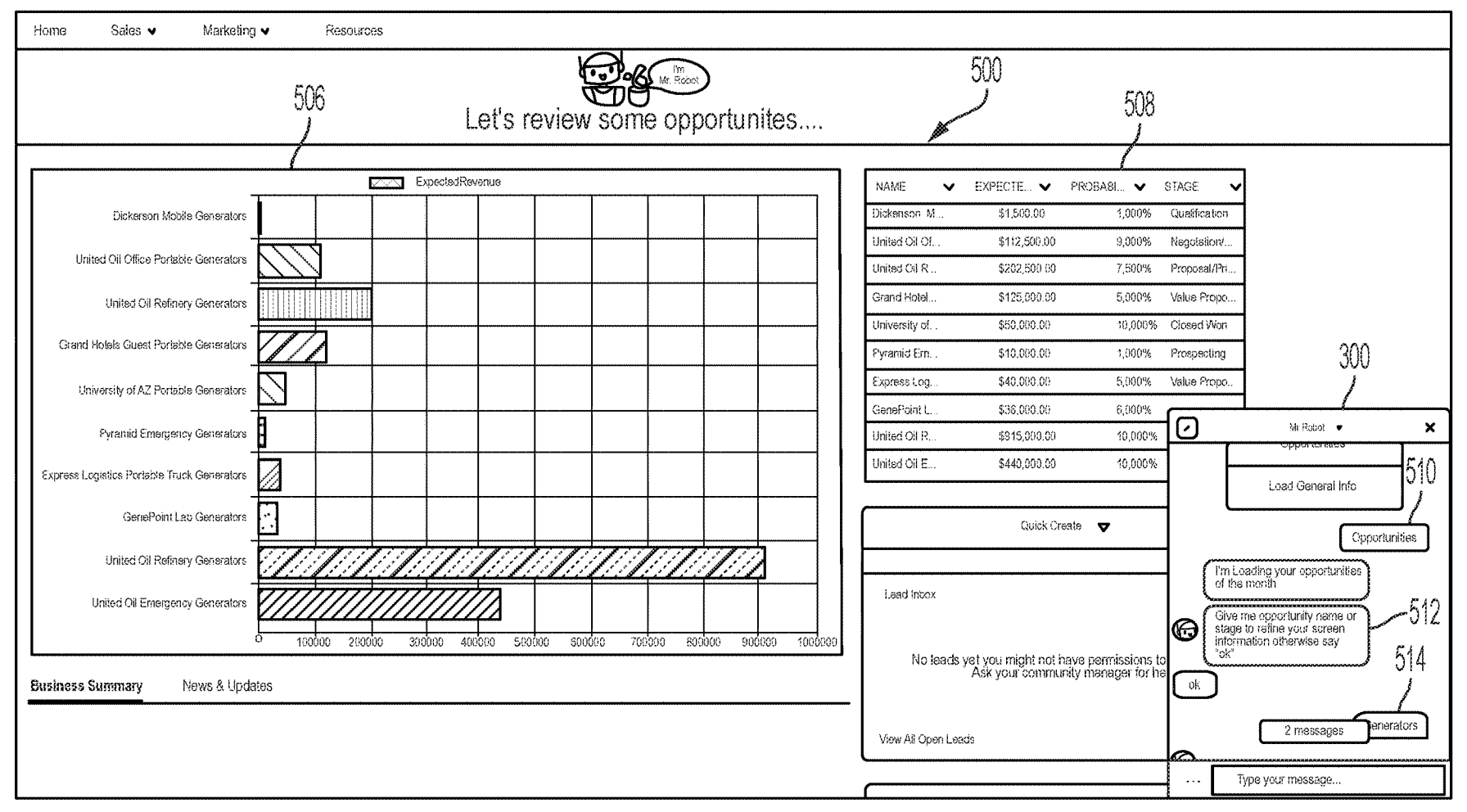
Figure 6:
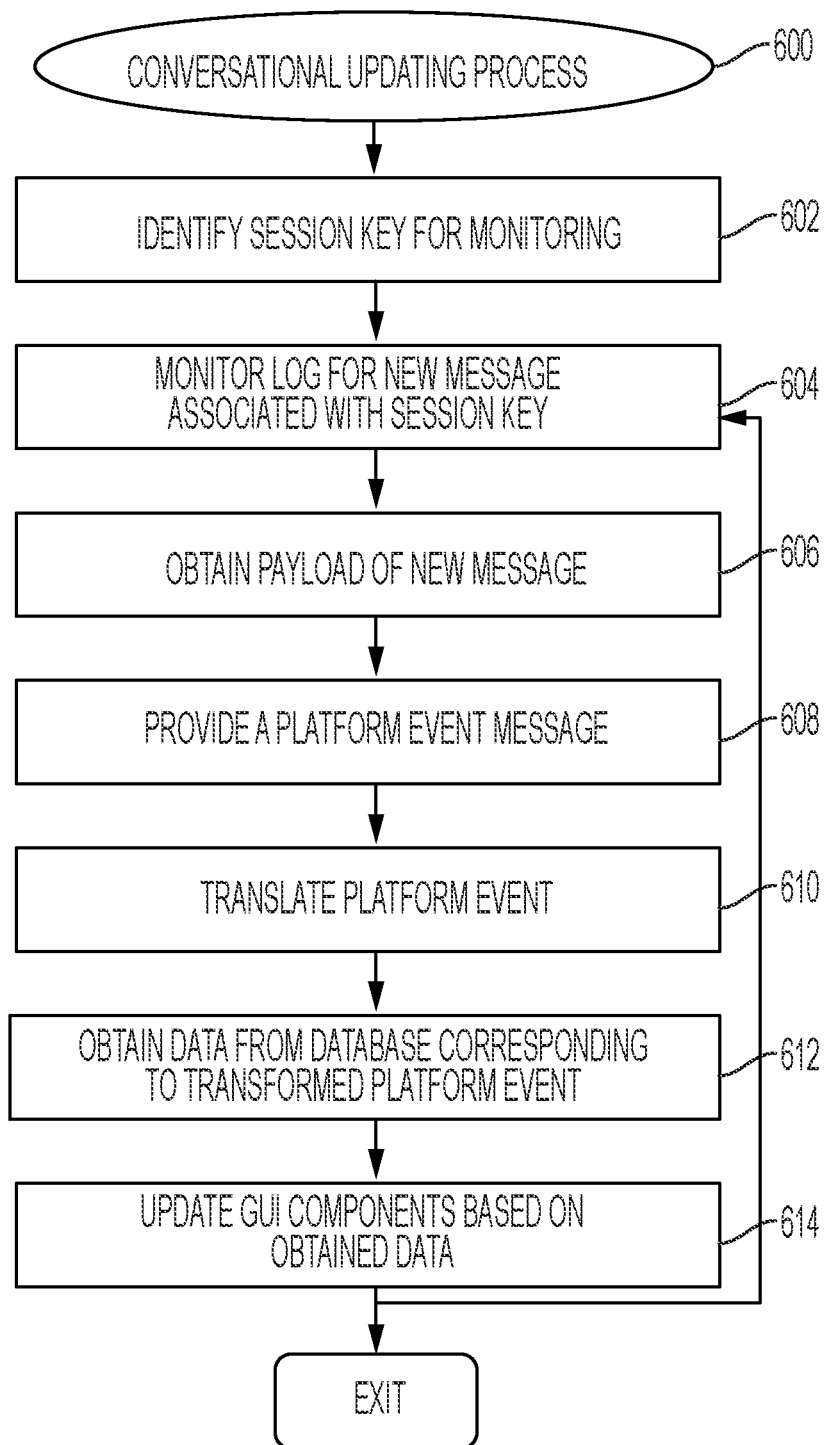
FIG. 6 is a flow diagram of an exemplary conversational updating process suitable for implementation in the computing system of FIG. 1 in accordance with one or more embodiments.

FIGS. 3-5 depict exemplary sequence of GUI displays that may be presented by the client application 107 in connection with the communications sequence 200 of FIG. 2 or the conversational updating process 600 of FIG. 6. FIG. 3 depicts an initial GUI display that may be presented within the client application 107 after authenticating the user of the client device 106 and initiating a conversation session. In this regard, the GUI display includes a conversation session GUI display 300 (or chat window) overlying a background GUI display 302. The chatbot 126 prompts the user for a conversational user input by generating or otherwise providing a list or menu 304 of selectable GUI elements within the chat window 300, with the selectable GUI elements 304 corresponding to different types of objects in the database 104 that the user may like to view or otherwise analyze. The illustrated background GUI display 302 includes a bar chart GUI component 306 and a list view GUI component 308, which may be initially generated by the application platform 124 based on a default set of data maintained in the object tables 110 of the database 104 that are associated with or otherwise accessible to the user.

Referring to FIGS. 3-4, the chatbot 126 receives a conversational user input in response to the user selecting a GUI element 310 from within the menu 304 or the user inputting or otherwise providing the name of an object presented within the menu 304 within a text box 312 configured to receive conversational user input. In response to receiving 210 conversational user input indicating the user would like to view data pertaining to his or her accounts, the chatbot 126 generates or otherwise creates 210 a new message entry in the conversation log 142 in the platform event database 140 that includes payload indicating the account database object type as being of interest to the user. The new message entry may also include the user identifier for the user making the request along with the session key.

The message broker 130 identifies the new message entry in the conversation log 142 and retrieves 212 the payload of the message from the platform event database 140. The message broker 130 and/or the message translator 132 identifies the message payload as invoking account database objects and then queries the database 104 to obtain, from the object tables 110, one or more fields of various instances of account database objects that are associated with or otherwise accessible to the user of the client device 106 (e.g., by using the user's identifier or another identifier associated with the user as a filter). Based on the retrieved account data 214, the message broker 130 and/or the message translator 132 updates the bar chart component 306 and the list view component 308 to reflect the retrieved account data, resulting in the updated background GUI display 400 that includes an updated bar chart component 406 and an updated list view component 408 that graphically depicts the user's account data (or a relevant subset thereof). In this regard, the message broker 130 and/or the message translator 132 may generate the updated GUI components 406, 408 based on the retrieved account data and transmit or otherwise provide 216 the code, data, and/or other information for rendering the updated GUI components 406, 408 to the client application 107, which, in turn, generates or otherwise renders the updated GUI display 400 including the updated GUI components 406, 408.

Referring to FIG. 5 with reference to FIG. 3, the conversational updating process may repeat throughout the duration of the conversation session to dynamically update the background GUI display responsive to conversational user inputs received via the chat window 300. For example, an initial conversational user input 510 identifying opportunity as the object type of interest, which results in the message broker 130 and/or the message translator 132 querying the database 104 to obtain, from the object tables 110, one or more fields of various instances of opportunity database objects that are associated with or otherwise accessible to the user of the client device 106 (e.g., by using the user's identifier or another identifier associated with the user as a filter), generating the initial GUI components 306, 308 based on the retrieved opportunity data, and transmitting or otherwise providing, via the network 108, the code, data, and/or other information for rendering the initial GUI components 306, 308 to the client application 107, which, in turn, generates or otherwise renders the initial GUI display 302. Responsive to the initial conversational user input 510, the chatbot 126 may generate or otherwise provide a conversational response 512 that prompts the user to provide further input to continue to refine the background GUI display 302.

In the illustrated embodiment of FIG. 5, a subsequent conversational user input 514 identifies generators as the stage of interest for the user's opportunities, which results in the message broker 130 and/or the message translator 132 generating one or more query statements for querying the database 104 to obtain data pertaining only to the user's opportunity database objects that have one or more associated fields that designate those opportunities as being generators. In this regard, subsequent conversational user inputs may provide attributes, fields, or other information that may be utilized to dynamically filter or otherwise refine the background GUI display. The message broker 130 and/or the message translator 132 query the database 104 to obtain, from the object tables 110, one or more fields of various instances of opportunity database objects that are designated as generators and associated with or otherwise accessible to the user of the client device 106, generate the updated GUI components 506, 508 based on the retrieved data for the user's opportunities that are generators, and then transmit or otherwise provide, via the network 108, the code, data, and/or other information for rendering the updated GUI components 506, 508 to the client application 107, which, in turn, generates or otherwise renders the updated GUI display 500. In this regard, in response to the conversational user input 514 identifying generators as a field or attribute by which to filter the opportunity objects, the background GUI display presented within the client application 107 behind the chat window 300 may be dynamically updated from the initial GUI display 302 to the updated GUI display 500 substantially in real-time.

FIG. 6 depicts an exemplary embodiment of a conversational updating process 600 suitable for implementation in a computing system to enable performance of database actions responsive conversational user inputs. For illustrative purposes, the following description may refer to elements mentioned above in connection with FIGS. 1-5. In this regard, while portions of the conversational updating process 600 may be performed by different elements of the computing system 100, for purposes of explanation, the subject matter is described herein in the context of the conversational updating process 600 being primarily performed by the application platform 124, the message broker 130 and/or the message translator 132 that are implemented or executed by the processing system 120 at the server 102. It should be appreciated that the conversational updating process 600 may include any number of additional or alternative tasks, the tasks need not be performed in the illustrated order and/or the tasks may be performed concurrently, and/or the conversational updating process 600 may be incorporated into a more comprehensive procedure or process having additional functionality not described in detail herein. Moreover, one or more of the tasks shown and described in the context of FIG. 6 could be omitted from a practical embodiment of the conversational updating process 600 as long as the intended overall functionality remains intact.

The conversational updating process 600 begins with the message broker 130 identifying or otherwise obtaining the session key or other identifiers for a conversation session to be subscribed to and monitoring the conversation log in the platform event database for a new message associated with the subscribed conversation session (tasks 602, 604). In response to identifying a new bot message event, the message broker 130 retrieves or otherwise obtains the payload or content associated with the new bot message event from the platform event database 140 (task 606). For example, the message broker 130 and/or the message translator 132 may transform the platform event message into one or more query statements for obtaining the relevant subset of data from the database 104 that corresponds to the payload of the new message (tasks 608, 610, 612). In one embodiment, the message translator 132 may transform the payload from a format associated with the platform event (e.g., a bot message event) into a different platform event format for subsequent presentation or rendering (e.g., a GUI event) using the query results. Thereafter, the conversational updating process 600 updates one or more GUI components or GUI displays presented at the client application 107 to reflect the data obtained from querying the database (task 614), as described above.

Figure 7:
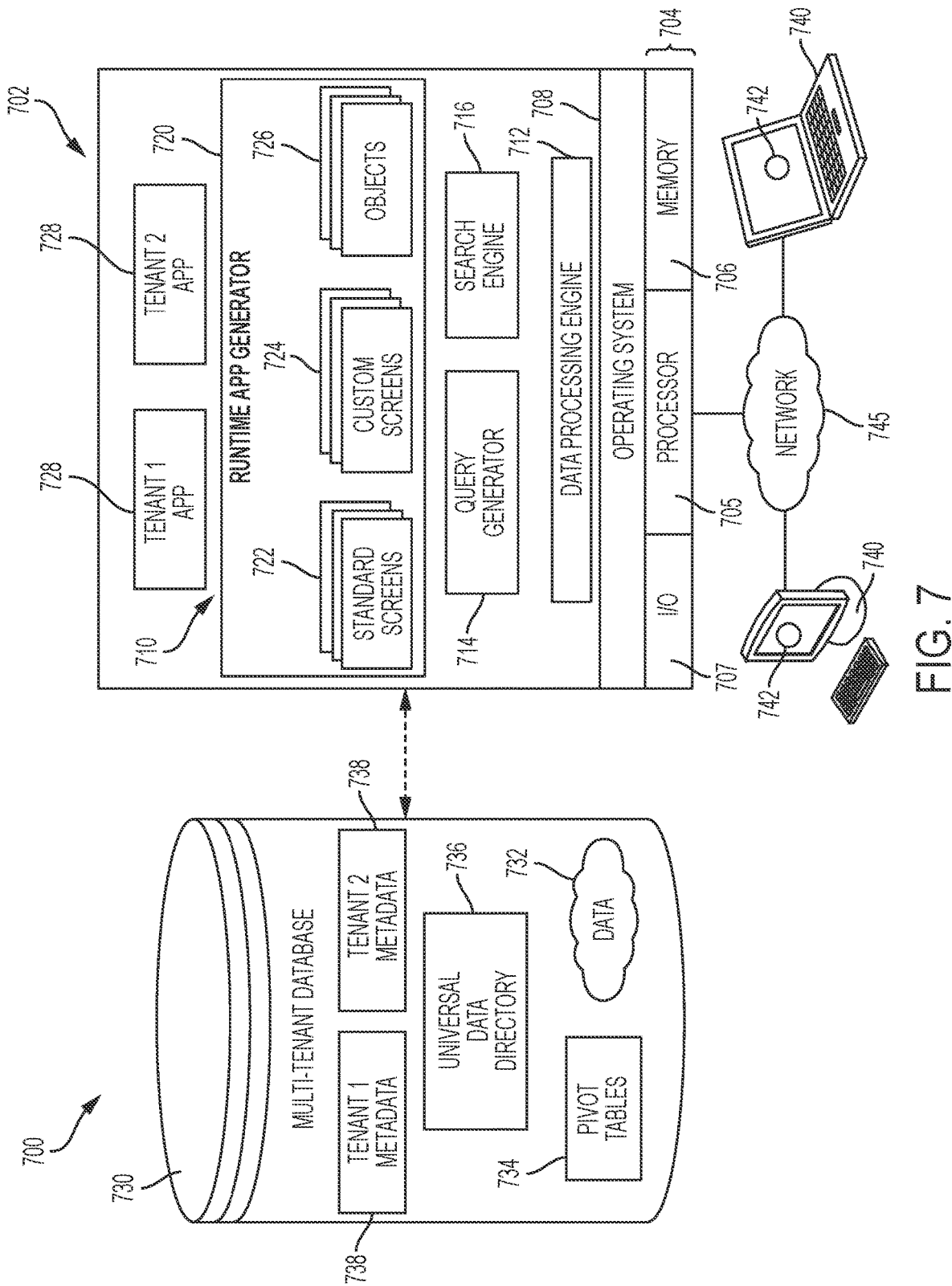
FIG. 7 is a block diagram of an exemplary multi-tenant system suitable for use with the computing system of FIG. 1 in accordance with one or more embodiments.

FIG. 7 depicts an exemplary embodiment of an on-demand multi-tenant database system 700 suitable for use with the conversational updating process 600 of FIG. 6 or the computing system 100 of FIG. 1. The illustrated multi-tenant system 700 of FIG. 7 includes a server 702, such as server 102, that dynamically creates and supports virtual applications 728 based upon data 732 from a common database 730 (e.g., database 104) that is shared between multiple tenants, alternatively referred to herein as a multi-tenant database. Data and services generated by the virtual applications 728 are provided via a network 745 (e.g., network 108) to any number of client devices 740 (e.g., client device 106), as desired. Each virtual application 728 is suitably generated at run-time (or on-demand) using a common application platform 710 (e.g., application platform 124) that securely provides access to the data 732 in the database 730 for each of the various tenants subscribing to the multi-tenant system 700. In accordance with one non-limiting example, the multi-tenant system 700 is implemented in the form of an on-demand multi-tenant customer relationship management (CRM) system that can support any number of authenticated users of multiple tenants.

As used herein, a "tenant" or an "organization" should be understood as referring to a group of one or more users that shares access to common subset of the data within the multi-tenant database 730. In this regard, each tenant includes one or more users associated with, assigned to, or otherwise belonging to that respective tenant. To put it another way, each respective user within the multi-tenant system 700 is associated with, assigned to, or otherwise belongs to a particular tenant of the plurality of tenants supported by the multi-tenant system 700. Tenants may represent customers, customer departments, business or legal organizations, and/or any other entities that maintain data for particular sets of users within the multi-tenant system 700 (i.e., in the multi-tenant database 730). For example, the application server 702 may be associated with one or more tenants supported by the multi-tenant system 700. Although multiple tenants may share access to the server 702 and the database 730, the particular data and services provided from the server 702 to each tenant can be securely isolated from those provided to other tenants (e.g., by restricting other tenants from accessing a particular tenant's data using that tenant's unique organization identifier as a filtering criterion). The multi-tenant architecture therefore allows different sets of users to share functionality and hardware resources without necessarily sharing any of the data 732 belonging to or otherwise associated with other tenants.

The multi-tenant database 730 is any sort of repository or other data storage system capable of storing and managing the data 732 associated with any number of tenants. The database 730 may be implemented using any type of conventional database server hardware. In various embodiments, the database 730 shares processing hardware 704 with the server 702. In other embodiments, the database 730 is implemented using separate physical and/or virtual database server hardware that communicates with the server 702 to perform the various functions described herein. In an exemplary embodiment, the database 730 includes a database management system or other equivalent software capable of determining an optimal query plan for retrieving and providing a particular subset of the data 732 to an instance of virtual application 728 in response to a query initiated or otherwise provided by a virtual application 728. The multi-tenant database 730 may alternatively be referred to herein as an on-demand database, in that the multi-tenant database 730 provides (or is available to provide) data at run-time to on-demand virtual applications 728 generated by the application platform 710.

In practice, the data 732 may be organized and formatted in any manner to support the application platform 710. In various embodiments, the data 732 is suitably organized into a relatively small number of large data tables to maintain a semi-amorphous "heap"-type format. The data 732 can then be organized as needed for a particular virtual application 728. In various embodiments, conventional data relationships are established using any number of pivot tables 734 that establish indexing, uniqueness, relationships between entities, and/or other aspects of conventional database organization as desired. Further data manipulation and report formatting is generally performed at run-time using a variety of metadata constructs. Metadata within a universal data directory (UDD) 736, for example, can be used to describe any number of forms, reports, workflows, user access privileges, business logic and other constructs that are common to multiple tenants. Tenant-specific formatting, functions and other constructs may be maintained as tenant-specific metadata 738 for each tenant, as desired. Rather than forcing the data 732 into an inflexible global structure that is common to all tenants and applications, the database 730 is organized to be relatively amorphous, with the pivot tables 734 and the metadata 738 providing additional structure on an as-needed basis. To that end, the application platform 710 suitably uses the pivot tables 734 and/or the metadata 738 to generate "virtual" components of the virtual applications 728 to logically obtain, process, and present the relatively amorphous data 732 from the database 730.

Still referring to FIG. 7, the server 702 is implemented using one or more actual and/or virtual computing systems that collectively provide the dynamic application platform 710 for generating the virtual applications 728. For example, the server 702 may be implemented using a cluster of actual and/or virtual servers operating in conjunction with each other, typically in association with conventional network communications, cluster management, load balancing and other features as appropriate. The server 702 operates with any sort of conventional processing hardware 704, such as a processor 705, memory 706, input/output features 707 and the like. The input/output features 707 generally represent the interface(s) to networks (e.g., to the network 745, or any other local area, wide area or other network), mass storage, display devices, data entry devices and/or the like. The processor 705 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 706 represents any non-transitory short or long-term storage or other computer-readable media capable of storing programming instructions for execution on the processor 705, including any sort of random access memory (RAM), read only memory (ROM), flash memory, magnetic or optical mass storage, and/or the like. The computer-executable programming instructions, when read and executed by the server 702 and/or processor 705, cause the server 702 and/or processor 705 to create, generate, or otherwise facilitate the application platform 710 and/or virtual applications 728 and perform one or more additional tasks, operations, functions, and/or processes described herein. It should be noted that the memory 706 represents one suitable implementation of such computer-readable media, and alternatively or additionally, the server 702 could receive and cooperate with external computer-readable media that is realized as a portable or mobile component or application platform, e.g., a portable hard drive, a USB flash drive, an optical disc, or the like.

The application platform 710 is any sort of software application or other data processing engine that generates the virtual applications 728 that provide data and/or services to the client devices 740. In a typical embodiment, the application platform 710 gains access to processing resources, communications interfaces and other features of the processing hardware 704 using any sort of conventional or proprietary operating system 708. The virtual applications 728 are typically generated at run-time in response to input received from the client devices 740. For the illustrated embodiment, the application platform 710 includes a bulk data processing engine 712, a query generator 714, a search engine 716 that provides text indexing and other search functionality, and a runtime application generator 720. Each of these features may be implemented as a separate process or other module, and many equivalent embodiments could include different and/or additional features, components or other modules as desired.

The runtime application generator 720 dynamically builds and executes the virtual applications 728 in response to specific requests received from the client devices 740. The virtual applications 728 are typically constructed in accordance with the tenant-specific metadata 738, which describes the particular tables, reports, interfaces and/or other features of the particular application 728. In various embodiments, each virtual application 728 generates dynamic web content that can be served to a browser or other client program 742 associated with its client device 740, as appropriate.

The runtime application generator 720 suitably interacts with the query generator 714 to efficiently obtain multi-tenant data 732 from the database 730 as needed in response to input queries initiated or otherwise provided by users of the client devices 740. In a typical embodiment, the query generator 714 considers the identity of the user requesting a particular function (along with the user's associated tenant), and then builds and executes queries to the database 730 using system-wide metadata 736, tenant specific metadata 738, pivot tables 734, and/or any other available resources. The query generator 714 in this example therefore maintains security of the common database 730 by ensuring that queries are consistent with access privileges granted to the user and/or tenant that initiated the request. In this manner, the query generator 714 suitably obtains requested subsets of data 732 accessible to a user and/or tenant from the database 730 as needed to populate the tables, reports or other features of the particular virtual application 728 for that user and/or tenant.

Still referring to FIG. 7, the data processing engine 712 performs bulk processing operations on the data 732 such as uploads or downloads, updates, online transaction processing, and/or the like. In many embodiments, less urgent bulk processing of the data 732 can be scheduled to occur as processing resources become available, thereby giving priority to more urgent data processing by the query generator 714, the search engine 716, the virtual applications 728, etc.

In exemplary embodiments, the application platform 710 is utilized to create and/or generate data-driven virtual applications 728 for the tenants that they support. Such virtual applications 728 may make use of interface features such as custom (or tenant-specific) screens 724, standard (or universal) screens 722 or the like. Any number of custom and/or standard objects 726 may also be available for integration into tenant-developed virtual applications 728. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system. For example, a virtual CRM application may utilize standard objects 726 such as "account" objects, "opportunity" objects, "contact" objects, or the like. The data 732 associated with each virtual application 728 is provided to the database 730, as appropriate, and stored until it is requested or is otherwise needed, along with the metadata 738 that describes the particular features (e.g., reports, tables, functions, objects, fields, formulas, code, etc.) of that particular virtual application 728. For example, a virtual application 728 may include a number of objects 726 accessible to a tenant, wherein for each object 726 accessible to the tenant, information pertaining to its object type along with values for various fields associated with that respective object type are maintained as metadata 738 in the database 730. In this regard, the object type defines the structure (e.g., the formatting, functions and other constructs) of each respective object 726 and the various fields associated therewith.

Still referring to FIG. 7, the data and services provided by the server 702 can be retrieved using any sort of personal computer, mobile telephone, tablet or other network-enabled client device 740 on the network 745. In an exemplary embodiment, the client device 740 includes a display device, such as a monitor, screen, or another conventional electronic display capable of graphically presenting data and/or information retrieved from the multi-tenant database 730. Typically, the user operates a conventional browser application or other client program 742 (e.g., client application 107) executed by the client device 740 to contact the server 702 via the network 745 using a networking protocol, such as the hypertext transport protocol (HTTP) or the like. The user typically authenticates his or her identity to the server 702 to obtain a session identifier ("SessionID") that identifies the user in subsequent communications with the server 702. When the identified user requests access to a virtual application 728, the runtime application generator 720 suitably creates the application at run time based upon the metadata 738, as appropriate. As noted above, the virtual application 728 may contain Java, ActiveX, or other content that can be presented using conventional client software running on the client device 740; other embodiments may simply provide dynamic web or other content that can be presented and viewed by the user, as desired.

Referring again to FIGS. 1-6 with reference to FIG. 7, in one or more exemplary embodiments, the server 702 and/or the application platform 710 supports the conversational updating process 600 to provide dynamic GUI updates within client programs 742 at client devices 740 in response to conversational inputs. In this regard, the server 702 and/or the application platform 710 queries the database 730 to obtain the relevant subset of an organization's or tenant's data from the database 104 that is accessible to the user of a client device 740 and corresponds to the conversational user input received from that user, and then updates one or more GUI components or GUI displays presented at the client device 740 by the client program 742 to reflect the data obtained from querying the database 730 as described above.

In sum, the subject matter described herein provides a framework that functions as a bridge between a chatbot and components of other platforms. When a conversation between a user and a chatbot is started, the framework pairs the GUI with the chat session and then starts publishing platform events depending upon the topics in discussion. When the chatbot publishes a platform event, the message broker listening for platform events for that chat session will identify the new platform event and transform it into the appropriate form or format for a corresponding event in the destination platform. Any number of components in the destination platform can be subscribed to the chat session via the message broker to dynamically react to conversational user inputs received via the chat session.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to querying and other database functions, multi-tenancy, cloud computing, on-demand applications, artificial intelligence, speech recognition or analysis, digital assistants, and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first," "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processing systems or devices can carry out the described operations, tasks, and functions by manipulating electrical signals representing data bits at accessible memory locations, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any non-transitory medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like. In this regard, the subject matter described herein can be implemented in the context of any computer-implemented system and/or in connection with two or more separate and distinct computer-implemented systems that cooperate and communicate with one another. In one or more exemplary embodiments, the subject matter described herein is implemented in conjunction with a virtual customer relationship management (CRM) application in a multi-tenant environment.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed is:

1. A computing system comprising:
   a non-transitory machine-readable storage medium that stores software; and
   a processor, coupled to the non-transitory machine-readable storage medium, to execute the software that implements a chatbot initiated from a web page associated with an application to receive conversational user input from a chatbot user interface concurrently presented with a graphical user interface associated with the web page at a client device coupled to a network and is configurable to:
   utilize natural language processing to analyze the conversational user input to identify an intent of a user of the client device to perform a request;
   identify a record responsive to the request;
   query a component of a platform to obtain resulting data corresponding to the record using information extracted from the conversational user input; and
   automatically update the graphical user interface associated with the web page at the client device in response to the conversational user input using the resulting data while the chatbot user interface is concurrently displayed at the client device, wherein a representation of the conversational user input is displayed via the chatbot user interface at the client device.

2. The computing system of claim 1, wherein the chatbot comprises an application programming interface (API).

3. The computing system of claim 1, wherein the software is configurable to utilize the natural language processing to extract the information from the conversational user input.

4. A method of automatically updating a graphical user interface (GUI) associated with a web page associated with an application generated by an application platform responsive to conversational user interactions with a chatbot initiated from the web page, the method comprising:
   identifying a conversational user input in a conversation log, wherein the conversational user input is associated with a conversation session associated with a chatbot user interface at a client device coupled to a network, wherein the chatbot user interface and the GUI associated with the web page are concurrently displayed at the client device and a graphical representation of the conversational user input is displayed via the chatbot user interface at the client device;
   analyzing the conversational user input using natural language processing to identify an intent to perform an action and extract one or more attributes or fields from the conversational user input;
   performing the action with respect to a component of the application platform using the one or more attributes or fields extracted from the conversational user input to obtain resulting data corresponding to the action from the application platform; and
   automatically updating the GUI associated with the web page at the client device over the network in response to the conversational user input to reflect the resulting data while the chatbot user interface is concurrently displayed at the client device.

5. A non-transitory computer-readable medium having instructions stored thereon that, when executed by a processing system, cause the processing system to:
   identify a record responsive to a request from a chatbot, wherein the request corresponds to a conversational user input,
   wherein a representation of the conversational user input is displayed via a chatbot user interface at a client device,
   wherein the chatbot is initiated from a web page associated with an application, and
   wherein the chatbot user interface and a graphical user interface associated with the web page are concurrently displayed at the client device; and
   in response to identifying the record responsive to the request:
   query a component of a platform to obtain record data corresponding to the record using information extracted from the conversational user input; and
   while the chatbot user interface is concurrently displayed at the client device, automatically update the graphical user interface associated with the web page at the client device in response to the conversational user input using the record data.

6. The computer-readable medium of claim 5, wherein the instructions cause the processing system to utilize natural language processing to analyze the conversational user input to identify the record from the conversational user input.

7. The computer-readable medium of claim 6, wherein the instructions cause the processing system to utilize natural language processing to extract details from the conversational user input and query the component of the platform using the details to obtain the record data.

8. The computer-readable medium of claim 7, wherein the details comprise one or more attributes or fields provided in the conversational user input.

9. The computer-readable medium of claim 5, wherein the chatbot comprises an application programming interface (API) initiated in response to a user selecting a graphical user interface element for a feature supported by the platform.

10. The computer-readable medium of claim 9, wherein the feature comprises a help feature or a digital assistant.

11. The computer-readable medium of claim 5, wherein the web page corresponds to an instance of a virtual application generated by the platform within a client application at the client device; and
the graphical user interface associated with the web page and the chatbot user interface are concurrently displayed within the client application.

12. The computer-readable medium of claim 11, wherein the chatbot comprises an application programming interface (API) initiated in response to a user selecting a graphical user interface element for a feature supported by the platform.

13. The computer-readable medium of claim 12, wherein the feature comprises a virtual agent.

14. The computer-readable medium of claim 11, wherein the conversational user input comprises an unconstrained string or combination of words provided via the chatbot user interface in a free-form or unstructured manner using natural language.

15. The computer-readable medium of claim 5, wherein the conversational user input is provided within the chatbot user interface.

16. The computer-readable medium of claim 5, wherein the conversational user input comprises user selection of a graphical user interface element within the chatbot user interface.

17. The computer-readable medium of claim 5, wherein the conversational user input comprises an unconstrained string or combination of words provided via the chatbot user interface in a free-form or unstructured manner using natural language.

18. The computer-readable medium of claim 5, wherein the chatbot user interface overlies the graphical user interface associated with the web page.

19. The computer-readable medium of claim 5, wherein the chatbot user interface and the graphical user interface associated with the web page are concurrently displayed within a client application at the client device.

20. The computer-readable medium of claim 5, wherein the graphical user interface associated with the web page is automatically updated in the background in response to the conversational user input while the chatbot user interface is concurrently displayed overlying the graphical user interface associated with the web page.

* * * * *